May 28, 1963 H. E. TATEL 3,091,764
ANTICOLLISION SYSTEM FOR SHIPS AND PLANES
Filed Dec. 21, 1956 5 Sheets-Sheet 1

FIG. 1

INVENTOR.
HOWARD E. TATEL
BY
ATTORNEY.

May 28, 1963

H. E. TATEL 3,091,764

ANTICOLLISION SYSTEM FOR SHIPS AND PLANES

Filed Dec. 21, 1956

| BALANCED MODULATOR | K (AF source) | M (RF or IF source) | X (Output to) |
|---|---|---|---|
| 21 | 20(p,90°) | 18(w) | 22 |
| 16 | 14(p) | 18(w) | 23 |
| 47 | 48(q) | 45(k) | 155, 156 |
| 56 | 48(q) | 46(k) | 153, 154 |

INVENTOR.
HOWARD E. TATEL
BY
ATTORNEY.

INVENTOR.
HOWARD E. TATEL

BY
ATTORNEY.

May 28, 1963   H. E. TATEL   3,091,764
ANTICOLLISION SYSTEM FOR SHIPS AND PLANES
Filed Dec. 21, 1956   5 Sheets-Sheet 4

Fig. 8

INVENTOR
Howard E. Tatel
ATT'Y

May 28, 1963 H. E. TATEL 3,091,764
ANTICOLLISION SYSTEM FOR SHIPS AND PLANES
Filed Dec. 21, 1956 5 Sheets-Sheet 5

INVENTOR.
HOWARD E. TATEL
BY
ATTORNEY.

3,091,764
ANTICOLLISION SYSTEM FOR SHIPS
AND PLANES
Howard E. Tatel, Silver Spring, Md., assignor of 15 percent to Jules H. Sreb, Washington, D.C., 21.25 percent to William L. Abramowitz, Swampscott, Mass., 21.25 percent to William Epstein and 15 percent to Joseph Zallen, both of Brookline, Mass.; Molly Tatel, executrix of said Howard E. Tatel, deceased
Filed Dec. 21, 1956, Ser. No. 629,842
11 Claims. (Cl. 343—101)

This invention relates to an anticollision warning system for ships and planes. In particular it relates to a method whereby any plane or ship can continuously and automatically and in all weather conditions determine the relative directions of motion of all its neighbors with respect to its own direction of motion, thus avoiding collision.

Present day communication devices on ships and planes are of two types—radar and radio. Radar enables the operator to detect the presence of a neighbor and determine his distance and bearing, but it also detects many other objects such as mountains, large buildings, meteorological disturbances, and ocean waves. However, radar gives no ready information as to the heading or direction of the moving neighbor except by inaccurate, complex, and tedious tracking and often fails to detect small planes or ships.

The most advanced radio systems now in use with planes in particular, do enable a pilot to maintain a course with relation to a fixed source of signal, namely, a radio beacon. However, neither the radar nor radio systems now in use provide direct instantaneous information of the relative direction of any neighbors with respect to the course of a particular ship or plane. In brief, there is no satisfactory all-weather means for the operator to avoid collision with any of his neighbors.

This invention provides such an all-weather device for avoiding collision. It comprises providing each craft with a radio beacon emitting prescribed signals in all directions at a single universal frequency and a radio receiver operative at this universal frequency which instantaneously compares and displays the bearing and the heading of any neighboring craft. As used in this patent the word "craft" is intended to include both ships and planes, but it is preferable to use a different universal frequency for ships than for planes.

In one form this invention comprises providing at each beacon a radio signal containing an omnidirectional component and another component whose phase depends upon direction of transmission. At the receiver, these components are received by an omnidirectional portion of the antenna and appropriately phase-compared to provide a signal or signal components dependent on heading of the neighboring craft.

A portion of the transmitted signal is acted on by receiver antenna component or components having different directional characteristics to produce a set of new signals. This set of signals is appropriately combined with a signal derived from a portion of the transmitted signal acted on by a receiver antenna component or components having omnidirectional characteristics to provide a signal or signal components dependent on bearing of the neighboring craft.

These bearing and heading signals are combined in a presentation system so as to show the planar spatial configuration of the bearing and heading of neighboring craft.

A specific form of this invention comprises providing at each beacon a radio signal containing an omnidirectional RF component of the frequency $w$ modulated by a first reference signal and an RF component of frequency $w$ modulated by a second signal whose frequency is a multiple of the reference and whose phase angle of modulation with respect to a same multiple of the first reference signal is proportional to the angle that the direction of transmission to the receiving vessel makes with the heading of the transmitting vessel. At the main part of the receiver the RF is demodulated, the first reference signal brought up to the same multiple frequency, transforming the phase with respect to the first reference signal precisely as at the transmitter, and the signals compared in phase, thus presenting a phase angle difference, namely, the heading of the neighboring craft.

The transmitted signal has an unmodulated RF component which is acted upon simultaneously with the modulated components. The receiving system is provided with antenna components having different directional characteristics. Other parts of the receiver receive this unmodulated RF signal from these directional antenna components to provide a set of unmodulated IF signals which are separately balance-modulated with an internal AF reference signal. The main part of the receiver also receives an unmodulated RF portion of the transmitted signal from the omnidirectional component of the antenna. From this signal an IF signal is obtained which is then appropriately combined with the balance-modulated IF signals to produce two amplitude modulated signals, which are then demodulated. These two demodulated signals at the same frequency as the internal AF reference signal are then compared as to phase with this reference signal giving two signals which when vectorially combined give a vector whose angle is equal to the bearing of the neighboring craft.

The resultant bearing and heading vectors may be read separately or recorded. Preferably they are fed into a single cathode ray tube with appropriate control so that an instantaneous vectorial representation of both heading and bearing is displayed.

The operation of the transmitter and receiver are alternated on each craft so that fairly constant detection between two craft may be provided. Where the traffic is potentially heavy, it is preferred that the alternation of the transmitter and receiver on each craft be controlled in a highly random fashion so that there is only a minor coincidence of operation of more than one transmitter. This avoids jamming and saturation caused by a plurality of adjacent craft. The power of each transmitter is adjusted to cover only the desired range, so that only neighbors in the zone of interest are displayed. An alarm can be used in addition to the reading device to call attention to a neighboring craft.

For planes which normally fly in designated altitude zones, this invention is preferably modified so as to screen out signals except those in the selected zone. This is accomplished by altitude sensitive devices which transmit altitude information and also change the radio frequency of both transmitter and receiver as the plane changes its altitude zone. Thus, in each zone all planes are sending and receiving signals at an identical frequency. Manual control is provided to permit scanning of adjacent zones where desired.

On each craft it is preferred that a single antenna array function for both heading and bearing information. Thus, crossed vertical Adcock pairs fed identical signals 90° out of phase can form the direction responsive heading signal, while a symmetrically placed omnidirectional vertical monopole can be used to transmit the reference signal for the heading signal. In receiving, the omnidirectional monopole monitors the heading and reference signals, while the crossed Adcock pairs in combination with the monopole permit display of the bearing.

For a fuller understanding of this invention, a reference is made to a specific embodiment described below and in the drawings wherein.

Figure 1:
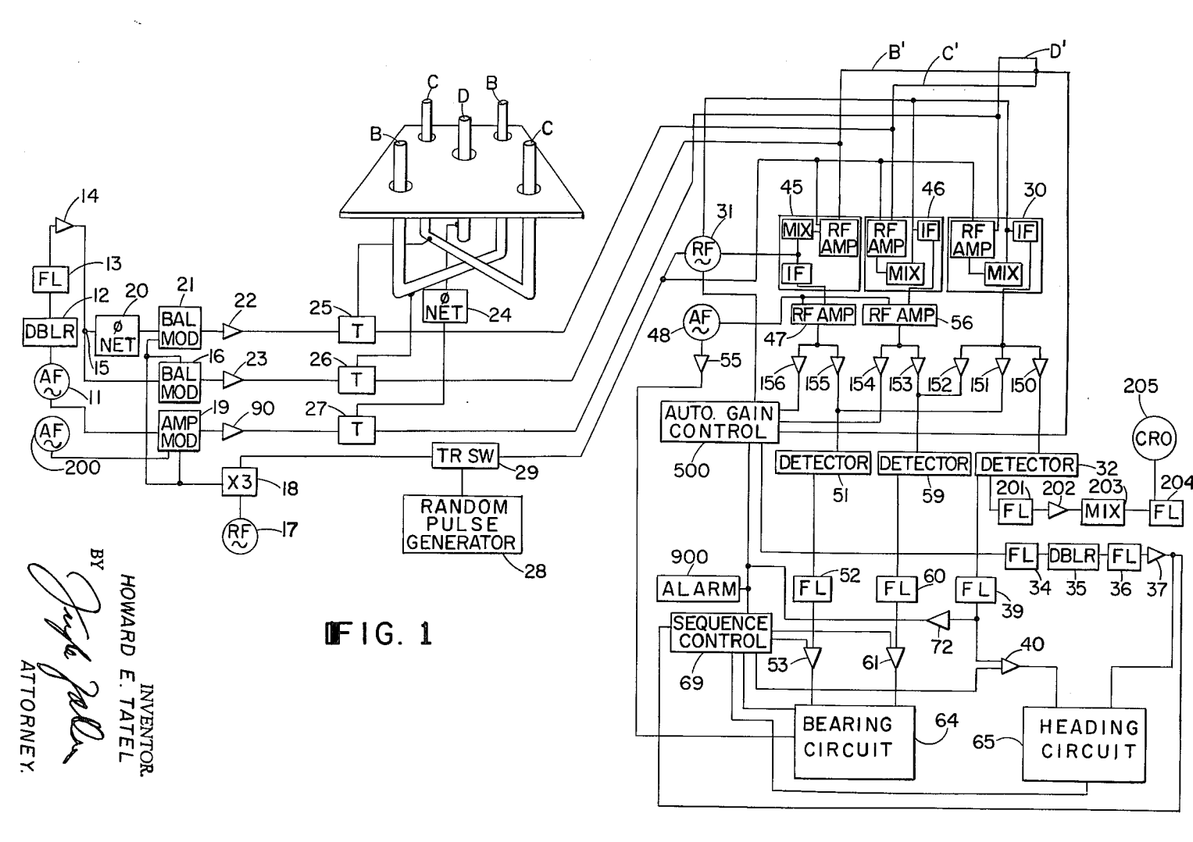
FIGURE 1 is a general schematic diagram of the invention as applied particularly to ships.

Referring to FIGURE 1, audio oscillator 11 provides a signal of AF frequency "$p$" which is fed to both a doubler 12 (e.g. full wave rectifier), and an amplitude modulator 19. The output signal of doubler 12 is rich in harmonics, so that when fed through an appropriate line filter 13 of the LC type there results a large second harmonic or "$2p$" signals, the other harmonics being suppressed. The "$2p$" signal is then fed to voltage amplifier 14 and then split into two paths at junction 15. Part of the signal passes to a 90° phase-shifting network 20 and from there to balanced modulator 21. The other part of the amplified "$2p$" signal is fed into balanced modulator 16.

Radio oscillator 17 having a fundamental frequency of $w/3$ provided by a stable quartz crystal, supplies a principal signal overtone through frequency multiplier 18 which has sufficient power to drive modulators 16, 19, and 21. The output of multiplier 18 is an RF signal of frequency $w$.

Control of the RF signal $w$ is provided by a random modulation control system comprising random pulse generator 28 and transmit-receive switch 29. The random pulse generator 28 is in this case triggered by a radioactive source as explained below, and operates transmit-receive switch 29, which is interlocked with multiplier-driver 18 and with certain portions of the receiver—namely, the RF-amplifier portions of mixers 45, 46, and 30 and local oscillator 31. The combination of the random pulse generator and intermodulator serve to turn on the driver 18 at irregular intervals for universal predetermined times, then shut off driver 18 and turn on the receiver sections 31, 45, 46, and 30. Since the pulses are random, only by chance coincidence will any two transmitters on separate craft be on at the same time.

The random pulse modulated RF signal of the frequency $w$ is fed to and drives modulators 16, 19, and 21. Balanced modulator 16 receives the amplified "$2p$" AF signal from amplifier 14 and the RF signal from driver 18. Modulator 16 alternately changes the phase angle of the RF signal 180° as the AF signal goes from positive to negative, so that when the AF signal to the balanced modulator 16 is positive the RF output of modulator 16 is in fixed phase relation with the phase of RF driver 18, but when the AF input signal is negative the RF signal is 180° out of said fixed phase. This "$2p$" balance-modulated RF signal is then amplified in power amplifier 23 and fed through a T junction 26 to one pair B of a crossed Adcock antenna.

Likewise, AF signal "$2p$" is shifted 90° in phase in network 20 and then combined with RF signal $w$ in balanced modulator 21 to provide a signal in AF phase quadrature with the signal from balanced modulator 16. The signal from 21 is amplified in power amplifier 22 and then fed to T junction 25 where it supplies the other Adcock pair C. Adcock pairs B and C are so adjusted in coupling and line lengths that the antenna currents are precisely in phase or phase opposition depending upon the modulation phase. By means of screen grid voltage adjustments in balanced modulators 16 and 21 the antenna currents are made equal without affecting the described phase relationship.

In amplitude modulator 19, AF reference phase signal $p$ from oscillator 11 amplitude-modulates RF signal $w$ which is then amplified in power amplifier 90. Other audio signals, as explained below, can modulate this RF signal. The output of amplifier 90 is shifted 90° in phase by passing through a phase-shift network 24 which can conveniently be an extra quarter wave length compared to length of lines to Adcock pairs B or C transmission lines. The signal passes through T junction 27 and then to symmetrically placed central vertical monopole D of the antenna array.

Adcock pair B has two parallel vertical elements separated approximately one eighth wave length. The two elements are driven together at radio frequency $w$ and 180° out of phase. The resultant signal is at frequency $w$ and substantially 90° out of phase with both elements. This is the basic RF antenna phase which is preferably measured in the forward direction along the horizontal line connecting the two elements or 0°. The phase is the same in the two quadrants 270° to 0° and 0° to 90°. In the opposite direction in the quandrants 90° to 180° and 180° to 270° the RF phase of the Adcock pair differs from the basic RF antenna phase by 180°. This pair is balanced modulated at AF frequency $2p$ and at the reference audio phase. Adcock pair C, which is placed so that the midpoint of a horizontal line connecting the two vertical elements bisects a similar line of pair B, is RF driven in the same manner as B but since its symmetry line is perpendicular to that of pair B, it emits basic RF antenna phase in the two quadrants 0° to 90° and 90° to 180°. In the two left quadrants 180° to 270° and 270° to 360° the RF phase is reversed. The RF driving pair C is balance modulated at AF frequency $2p$ and in AF quadrature with the reference AF phase. The vertical omnidirectional component of the antenna is placed coaxially with the axis of the Adcock pair. It is driven by an unmodulated component preferably larger than twice the amplitude of the Adcock pairs at radio frequency $w$ and in RF quadrature with the drive of the Adcock pairs. Since the basic antenna phase of the Adcock pairs is in quadrature with their drive, and the omnidirectional element is driven in quadrature to the RF drive, the two systems are in RF phase.

Thus, the signal radiated by the antenna system comprises a first "$2p$" balanced modulated component from one Adcock pair and a second "$2p$" balanced modulated component in AF phase quadrature with the first component both components having the same basic RF antenna phase. In addition a portion of the radiation from the axial omnidirectional radiator is unmodulated and in RF phase with the basic RF phase of the resultant signal from the crossed Adcock pair. At a distance of more than several wavelengths from the array, the combination of these three components is an RF signal of frequency $w$ modulated at frequency "$2p$." The phase of this modulation is directionally sensitive and changes uniformly and by an amount equal to the heading angle. The phase reference is carried by the modulation at frequency "$p$" of the RF signal at frequency $w$ radiated from the axial omnidirectional component of the antenna array. The RF phase of the radiation is immaterial for this portion of the signal. This omnidirectional radiation also carries other modulations which will be discussed later. The RF system is adusted by varying the RF line lengths from transmitter to antenna and there rotating the antenna until the AF phase shift in the forward direction with respect to the ship is zero.

The receiver is divided into three channels, each energized by one component of the antenna system. In this embodiment a single antenna is used for both transmitter and receiver. Thus, T junction 25 serves to connect Adcock pair C to either amplifier 22 in the transmitter and receiver section 46, 26 connects Adcock pair B to receiver section 45 and transmitter amplifier 23, while T junction 27 connects vertical monopole D to transmitter amplifier 90 and receiver section 30. Each receiver section 30, 45, and 46 has an RF amplifier section, a mixer-converter section and an IF amplifier section. Local RF oscillator 31 is common to all three receiver channels so the change in phase upon conversion is the same and therefore any phase distortion is alike in each channel and corrects out when the signals are phase compared. The local oscillator signal is of a frequency different from the transmitted signal by the IF frequency. The local oscillator multiplier of 31 and all the RF amplifiers are gated by the transmit-receive switch 29 in phase opposition to the transmitter. The asymmetric gating pulse leaves the receivers on most of the average duty cycle. This allows the receiver to receive a beacon pulse from any nearby craft except for the infrequent chance coincidence when both transmitters are on.

When the receiver is on, and an RF field is present from a nearby beacon the signal from the omnidirectional axial antenna component D is mixed with the signal from local oscillator 31 in the mixer portion of the receiver section 30. The beat between these two signals at the intermediate frequency is amplified in the IF portion of receiver section 30 and is fed through amplifier 150 into detector 32 where the IF signal is demodulated. In addition the IF portion of receiver section 30 supplies its signal to two cathode-coupled amplifiers 151 and 152.

The demodulated signal contains mixed AF components, comprising "$p$," and "$2p$," the latter with phase angle alpha which is the heading angle of the neighboring craft. There are other demodulated components which will be described below. Part of the output of detector 32 is fed to an automatic gain control 500 to be explained below. Part is sent to filter 34 where all but the "$p$" signal is removed. From filter 34 the signal is sent to frequency multiplier 35 where the signal is doubled to $2p$. This $2p$ signal of reference phase is then fed to another line filter 36 to remove the undesired harmonics, then to amplifier 37. Amplifier 37 supplies a signal to both sequence control 69 and the heading circuit 65 wherein the heading angle is to be read or displayed.

Another part of the output of detector 32 is fed to line filter 39 to remove all the signal except "$2p$, alpha." From filter 39 a portion of the filtered "$2p$, alpha" signal is amplified at amplifier 40 and then passed to the heading circuit 65. Another portion is fed to amplifier 72, thence to sequence control 69.

Thus, into heading circuit 65 is fed a filtered and amplified AF signal of frequency '$2p$" having a phase difference, alpha (from the standard), equal to the heading angle, and filtered and amplified signal "$2p$" which is in phase with the standard. These signals are displayed as alpha (heading) by cathode ray tube 610 as explained in detail below and shown in FIGURE 6.

The other two channels of the receiver are used to display a vector of angle beta (bearing angle). The signals coming in from the crossed Adcock pairs B and C are fed respectively to superheterodyne RF amplifier-mixer-IF amplifiers 45 and 46. Local oscillator 31 also feeds these mixer amplifiers. As a result IF signals are supplied by mixer portions of 45 and 46, to the IF amplifier portions. The amplified IF signal from mixer-amplifier 45 is fed into balanced modulator 47. The amplified IF signal from receiver section 46 is fed into balanced modulator 56. A separate audio oscillator 48 feeds a signal to balanced modulator 47, and to balanced modulator 56. The frequency $q$, of oscillator 48 is chosen for minimum interference with the signal at frequency "$p$." (Thus, with "$p$" at 1,000 c.p.s., the frequency of oscillator 48 could be 5,500.) Modulator 47 alternately changes the phase angle of its input IF signal $k$, 180° as the AF signal $q$, goes from positive to negative, as does modulator 56.

The output of balanced modulator 47 drives two cathode-coupled amplifiers 155 and 156. Cathode-coupled amplifier 156 energizes the automatic gain control circuit detector to be described below. The output of cathode coupled amplifier 155 is the amplified receiver balanced-modulated IF signal from Adcock pair B. It is mixed through a simple resistive network with the output of cathode coupled amplifier 151, which is the IF component of the symmetrically placed omnidirectional antenna component D after a 90° RF phase shift in phase shifter 24. (While there are many modulated components in the incoming wave, these will later be rejected, so therefore, consider only the unmodulated RF component.) The gains are so arranged that the amplitude of the omnidirectional component induced IF from amplifier 151 is greater than the balanced modulated IF component of Adcock pair B. These two components, simply mixed, combine at detector 51 input to form an amplitude modulated wave with modulation frequency $q$, the same as that of oscillator 48. In a similar manner, the balanced modulated signal from balanced modulator 56 energizes the cathode coupled amplifier 153 and the IF component of IF amplifier 30 originating from the 90° phase shifted RF signal of the omnidirectional antenna component D energizes cathode coupled amplifier 152. The outputs of amplifier 152 is simply mixed through a resistive network with that of cathode-coupled amplifier 153. The mixed output is fed into detector 59. The gain of the omnidirectionally energized channel is adjusted so that the unmodulated IF component fed into detector 51 is slightly greater than coming through the balanced modulated channel. The resultant signal into the detector 59 is thus also an amplitude modulated signal with the modulation frequency $q$ of oscillator 48.

The gain of the receiver sections 45 and 46 being the same, the amplitude of each synthesized wave is proportional to the RF signal incident to its receiver. Setting of the gains of receiver sections 45 and 46 can be accomplished by manually or by automatic gain control 500 through cathode coupled amplifiers 154 and 156 as described below. The difference in amplitude of these synthesized waves depends upon the directional characteristics of the two crossed Adcock pairs B and C. Adcock pair B responds to the incoming signal as cosine beta and pair C responds as sine beta where angle beta is the bearing angle. The demodulated output of detector 51 is filtered by line filter 52 and amplified at amplifier 53 to provide a signal amplitude of signal $q$ proportional to cosine beta at bearing circuit 64. In a similar way the demodulated signal from detector 59 after being filtered of all components except that of frequency $q$, by filter 60 energizes amplifier 61 and supplies a signal amplitude of signal $q$ proportional to sine beta to bearing circuit 64. (The bearing angle, beta, is the angle between the direction of reception and a line through Adcock pair B which is straight ahead.)

The heading circuit 65 may be any appropriate system for converting the phase-containing input signals into a display of heading angle, whether by recorder, meter, or cathode ray tube. Similarly, the bearing circuit may be any appropriate system for converting the phase-containing input signals into a display of bearing angle. However, it is preferred to present an instantaneous and simultaneous display of heading and bearing so that the navigator may readily take proper steps for adjusting his course. Especially preferred is a system whereby the heading circuit 65, bearing circuit 64, and sequence control system 69 are arranged to provide in a single cathode ray tube an instantaneous vectorial display of both heading and bearing for all neighboring craft.

Figures 6, 7:
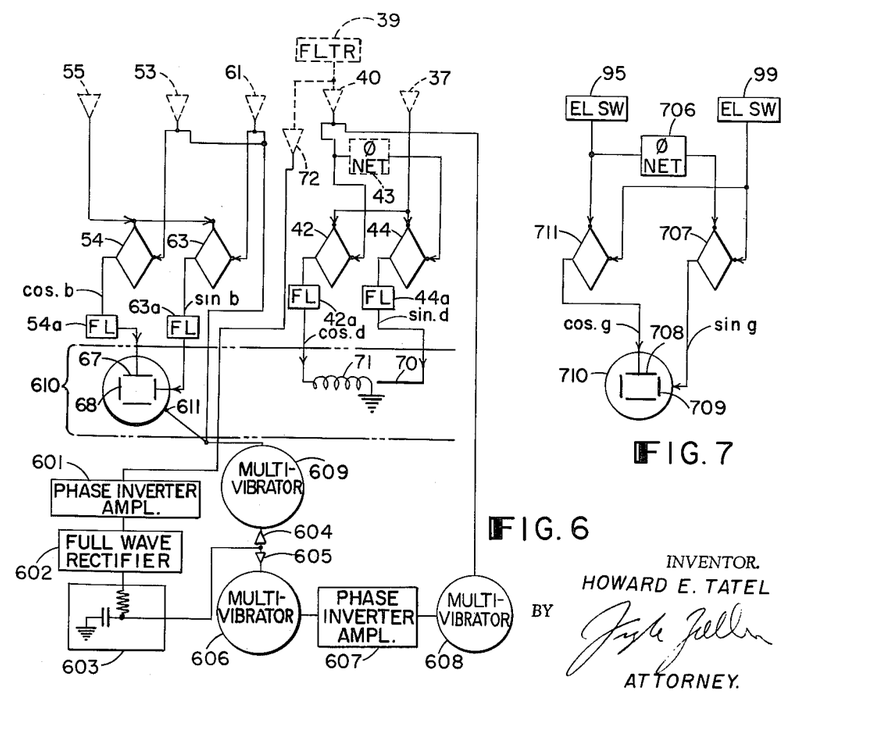
FIGURE 6 is a schematic diagram of a bearing-heading cathode ray tube system, with the circuit in FIGURE 1.
FIGURE 7 is an altitude reading cathode ray tube system, taken with reference to FIGURE 2.

Referring to FIGURES 1 and 6, the in-phase signal "2p" from amplifier 37 feeds phase-sensitive detectors 42 and 44. The heading directional signal, 2p, phase alpha, is fed from amplifier 40 directly to phase-sensitive detector 42 and through 90° phase-shifting network 43 to phase sensitive detector 44. The output current of phase detector 44 is proportional to sine alpha. The output of phase sensitive detector 42 is proportional to cosine alpha.

The output of amplifier 61, q, amplitude sine beta is fed to phase-sensitive detector 63. The output of amplifier 53 q, amplitude cosine beta is fed to phase-sensitive detector 54. The in-phase signal q, from amplifier 55 is fed to both phase-sensitive detectors 54 and 63. When the Adcock B signal to phase detector 54 is maximum, the Adcock C signal to phase-sensitive detector 63 is zero.

The phase-sensitive detectors 54 and 63 are both driven by the reference signal q from oscillator 48 through amplifier 55. The outputs of the phase detectors are pulsating unidirectional currents. The output amplitude of phase detector 54 is proportional to the cosine of the bearing angle and the output amplitude of phase detector 63 is proportional to the sine of the bearing angle. These are true vectorial components which will be used to actuate the vectorial indicator described below.

Figure 10:
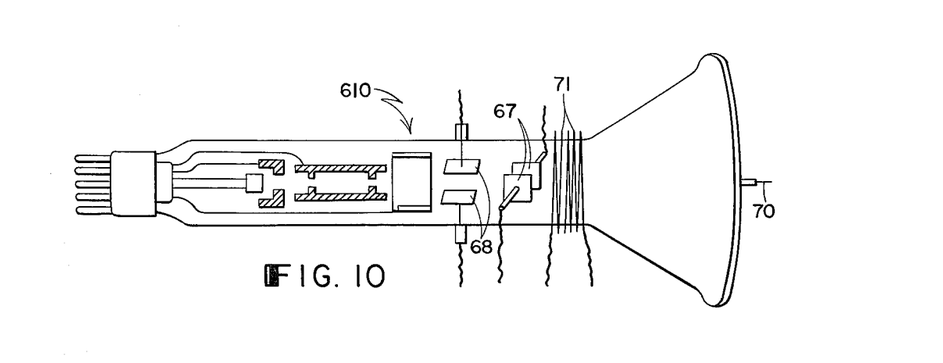
FIGURE 10 is a schematic view of the cathode ray tube.

The simultaneous presentation of the heading and bearing angles on cathode ray tube 610 is accomplished as follows, reference being had to FIGURES 6 and 10:

Tube 610 is an electrostatic deflection cathode ray tube with an axially aligned radial deflection electrode 70 at the tube screen or face and a coaxial coil 71 wound around its neck. The horizontal deflection plates 68 are driven by the signal proportional to sine beta from the phase sensitive detector 63 while the vertical plates 67 are driven from the phase sensitive detector 54 carrying the signal of amplitude proportional to cosine beta. A time sequence control is employed to order the application of the deflection signals to give a vector rather than a spot presentation on the tube.

The received signal modulated at frequency "2p" is used without reference to phase to initiate the generation of a series of pulses of different lengths according to a set of multivibrators. The sequence control system is actuated by amplifier 72 and gates the grids on amplifiers 53, 61, and 40 and intensity control grid 611 on the cathode ray tube. The demodulated filtered and amplified signal "2p" from amplifier 72 is maintained at a constant amplitude by means of the automatic gain control system 500, which will be detailed below.

The "2p" signal from amplifier 72 passes into phase inverter amplifier 601 which drives full wave rectifier 602. After full wave rectification of the signal at frequency "2p," the signal passes to RC filter 603, where a charge is stored in condenser C after leaking through resistance R, providing a brief time delay. The output of the filter 603 supplies cathode-coupled amplifiers 604 and 605. Amplifier 604 triggers monostable multivibrator 609 which supplies gating pulses to amplifiers 61, 53, and CR grid 611. Amplifier 605 operates monostable multivibrator 606 whose output pulse is inverted in phase in phase inverter amplifier 607 and then triggers monostable multivibrator 608. The multivibrator 608 supplies pulses to the gating grid of amplifier 40. The time delay corresponds to the time required for the AGC to reach steady state.

The performance of the tube may be visualized by considering appropriate voltages on the deflecting plates which place the spot from the electron beam on the face of the tube. Making the radial deflecting electrode more positive attracts the spot to another point and vice versa. Varying the voltage on this electrode carries the CR spot to trace a radial line. A current in coil 71 will produce an axial magnetic field so as to also tend to move the spots. Varying the coil voltage causes the spot to move along an arc centered at the face electrode. The sequence of events is shown in (a), (b), (c), (d), (e), and (f) of FIGURE 9.

The cathode ray indicator sequence control is designed to present both the bearing and heading vectors in sequence so that the cathode ray spot actually draws out the vector plan of the bearing and heading of neighboring craft.

In operation when multivibrator 609 is pulsed on, the beam of the CR tube 610 and bearing amplifiers 53 and 61 are kept on for the full length of the duty cycle of the presentation. The bearing signals pass through the amplifiers 53 and 61 and the phase sensitive detectors 54 and 63. The output of the detectors 54 and 63 are connected to the deflection plate of the CR tube through RC filters 54a and 63a. The time constant of the filters are adjusted so that the voltages come to full value in about one fifth of the total duty cycle of the presentation. As the cosine beta and sine beta voltages increase to their maximum the electron beam of the CR indicator traces out a radial line whose angle with respect to the lubber line marked on the indicator is the bearing angle of the neighboring craft. The voltages on the CR deflection plates rise to their maximum value and remain thus until the completion of the presentation duty cycle.

After about one half the time of this duty cycle has passed, and the bearing deflection has come to its maximum, the multivibrator 606 reverts to its original state and its reversion pulse through phase inverter 607 triggers monostable multivibrator 608. The pulse from multivibrator 608 turns on and holds on for the duration of the duty cycle the gating grids of amplifier 40 allowing the heading signal at frequency "2p" to be amplified and drive the phase sensitive detectors 42 and 44. The output of these are proportional to cosine alpha, sine alpha. The outputs have delayed rise due to output time constant filters 42a and 44a and the electron beam starting from the maximum bearing deflection traces out a line through the action of the coil 71 and radial deflection electrode 70 whose angle with respect to the bearing line is the heading angle. The complete trace is the combination of the bearing and heading vector traces. Shortly after the heading outputs reach their maximum value, multivibrators 609 and 608 revert to their original state, the cycle is over and the sequence control is ready to take on a new pulse. The beam intensity of the CR tube indicator is then zero.

Figure 9:
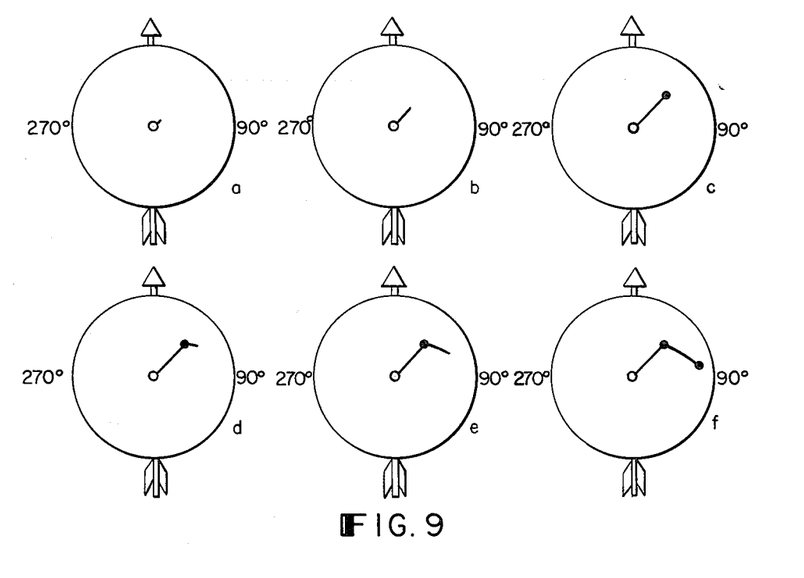
FIGURE 9 is an illustration of the display.

Visually, the sequence forms on the persistent screen of the cathode ray tube a radial trace whose angle with respect to the lubber line is the bearing (FIGURE 9a–c). As the bearing voltage builds up to maximum and the trace ends and the heading voltage buildup similarly forms a heading trace starting from the maximum bearing position (FIGURE 9d–f). The random pulse generator 28 through transmit-receive switch 29 and local oscillator 31 determines the actually available time intervals for writing bearing and heading information, the receiver being on except for the transmission intervals. All craft have pulse-forming circuits of sufficient precision and stability so that the controlling pulses are uniform within agreed tolerance, e.g. 5% in time. The long persistence of the screen provides retention of previous pulses as traces. The transmiter may be "on" at a mean rate of several times a second with transmission pulses of a few hundredths of a second, and thus provide in effect a continuous instantaneous and simultaneous vector presentation of bearing and heading. The actual presentation is in the form of the bearing trace intersecting the heading trace.

Figure 5:
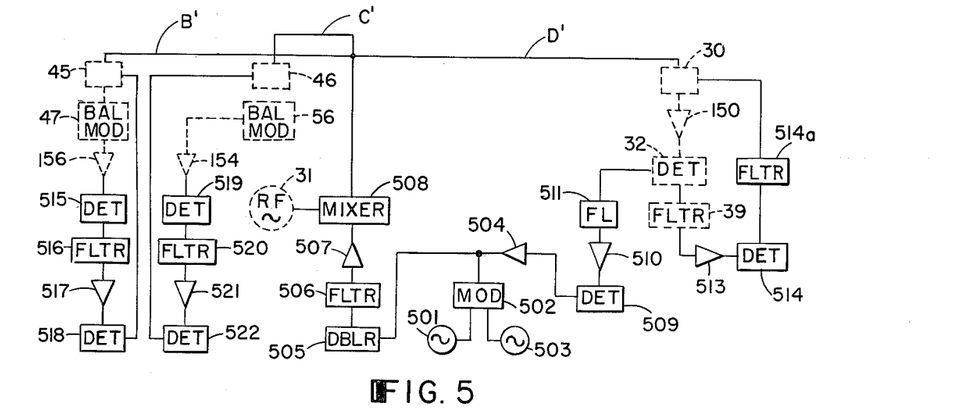
FIGURE 5 is a schematic diagram of an automatic gain control system as applied to FIGURE 1.

Automatci gain control 500 is preferred to manual control or ordinary automatic volume control. Craft near and far must be displaced with equal precision and therefore of comparable size since a speedy craft at great distance can be more hazardous than a slow nearby craft with which visual contact has already been established. Further, the relative levels of operation of the three receiver channels must be in proper relative adjustment for greatest effectiveness. In particular, the two Adcock antenna energized channels 45 and 46 should have their gains approximately equal and special measures must be applied for this for at some bearing, the signal from one of the other can be zero. In the preferred system described below, a special signal is generated to make automatic gain control operative in channels 45 and 46. The level of this signal is controlled by the omnidirectional channel 30.

The automatic gain control of the omnidirectional channel 30 separates out the unwanted AGC signal which is present on the second detector. From amplifier 513 there is a signal "2p" originally generated at a transmitter of a neighboring craft. This "2p" signal is detected by a full wave diode detector 514 and filtered at 514a with a time constant of no more than a few milliseconds so that the AGC is very fast acting. The output of detector 514 provides the bias of the IF amplifiers of the channel 30. Thus, with no signal present there is no bias to the IF and the gain is large, conversely with a large signal there is bias developed at the detector which tends to cut off the IF amplifiers, diminishing the gain. The low value of the time constant insures that the system has full gain in a very short time after detecting a signal from a nearby beacon.

In order to control the gain of channels 46 and 45 of the receiver, a signal must always be present. This is provided by oscillator 501 operated at "u" one half the IF of the receiver system which feeds a signal to the amplitude modulator 502. Also the modulator 502 receives from oscillator 503 a signal of lower frequency r chosen so as not to interfere with the other signals present. The modulated output of 502 is attenuated to a low value and then amplified by the variable gain amplifier 504. Its level of operation is determined by detector 509 the output of which has a time constant of only a few milliseconds so that the gain control action is rapid. Detector 509 is energized by a signal of frequency r, and its amplitude depends upon the gain of amplifier 504 and the gain of the omnidirectional channel of the receiver, the latter being fixed by the AGC loop dependent on the incoming RF level. At the operation level set by detector 509 and the signal r, amplifier 504 amplifies the signal u modulated by r. This signal passes into a harmonic generator 505 which is a simple crystal diode and the output amongst other signals is 2u modulated by r. 2u is equal to i the IF frequency of the receiver system. Filter 506 rejects all components except i modulated by r. After amplification by amplifier 507 it is fed into mixer 508 along with a portion of the signal from the receiver local oscillator 31 which is at w—i. The sum frequency in the mixer 508 is w modulated by r and this is loosely coupled into inputs of all receiver channels by feeds B, C, and D. The level of this signal is controlled by the incoming RF signal through the interactions in the omnidirectional receiver channel 30. The level of operation of this channel is set, as described above, by the RF signal and its AGC loop. At this particular gain level, the signal w modulated by r is amplified through receiver channel 30 and is detected in detector 32. All components of modulation are filtered out by filter 511 except the signal at frequency r. This is amplified in amplifier 510 and detected in detector 509. Here it is smoothed by a few millisecond time constant. The output of the detector 509 serves as a control bias for amplifier 504 to complete the circuit for the automatic control of signal w modulated by r.

By control of this bias the output level of the gain control signal generator is carefully controlled so its output is kept at a fairly uniform level with respect to the input RF signal onto the omnidirectional antenna system. This signal serves as a signal for the gain control loops of the Adcock channels in the receiver system. Both receiver channels therefore have a signal onto which to lock independent of the orientation of the antenna system.

The operation of the gain control loop of the channels 45 and 46 are the same as of channel 30. The signal w, modulated by r goes through the RF—IF system 45, 46 then through balanced modulators 47 and 56 which, as indicated, are the saturated type and have the effect of changing the RF phase 180° with each alternation of the balanced modulation driver at frequency q. This does not change the amplitude modulation envelope at frequency r of the IF signal. These signals pass through the isolation cathode coupler amplifiers 156 and 154 and thence to detectors 515 and 519 respectively. The demodulation signal at frequency r is the only signal passing through the filters, 516 and 520 then after amplification in amplifiers 517 and 521, the signals go to the detectors 518 and 522 where the signal at frequency r is rectified and filtered with a circuit of time constant of a few milliseconds. From the detectors 518 and 522 the rectified AGC signal goes to the control grid bias circuit of the IF of receivers 45 and 46 respectively. Thus, the gain control loops of these two channels keep the signal r at a constant level. Thus, the whole system is independent of the level of the incoming RF signal upon the omnidirectional antenna component. Furthermore the two Adcock receiver channels have a signal upon which to work which is independent of antenna orientation. The overall gain of the system is feed back stabilized through the AGC gain control loops and tends to be stable independent of tube and voltage fluctuations.

*Altitude Modification*

Figure 2:
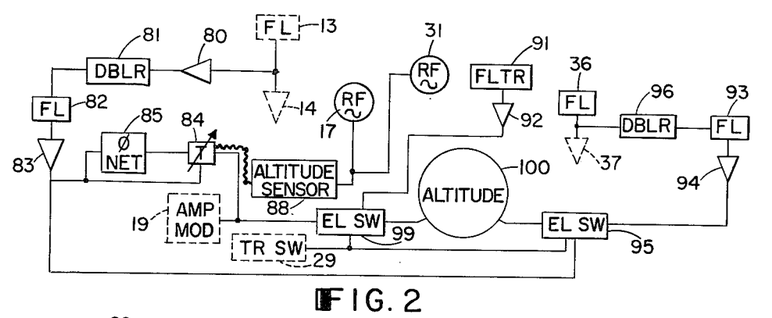
FIGURE 2 is a modification of FIGURE 1, as applied particularly to airplanes.

In a plane, altitude is an important consideration, since traffic control is generally within regulated zones of altitude. The altitude factor is brought into the system as just described by having altitude-sensitive means transmit altitude in terms of phase and control the basic frequency in RF oscillator 17 and local oscillator 31. In this event, both oscillators 17 and 31 are provided with a series of selective frequencies whose selection is made by the altitude sensing device.

Referring to FIGURE 2, altitude information is obtained by feeding the filtered "2p" AF signal from filter 13 through an amplifier 80 to another frequency multiplier 81 to provide an AF signal of frequency 4p. This 4p signal is filtered at 82 and amplified at 83. The resultant filtered signal is split, and part goes directly into a control transformer 84 and part to a 90° phase-changing network 85 and then to transformer 84.

Transformer 84 has two stator coil windings 90° with respect to one another and one indicating rotor whose output contains a phase shift proportional to rotation. The signal at frequency 4p goes to one stator and signal at frequency 4p, phase 90° goes to the other. The rotor shaft is actuated by a pressure aneroid in an altitude sensing device 88 so that the output is an AF signal of frequency 4p and phase angle gamma proportional to altitude. This signal is then fed to amplitude-modulator 19 wherein it modulates the RF signal, and is then amplified in power amplifier 90. The RF signal of frequency w has an amplitude modulation component 4p whose phase with respect to four times the standard signal at frequency "p" is gamma. This signal along with the other modulated and unmodulated components goes to the omnidirectional antenna component D.

On the receiving side, the 4p, gamma signal from detector 32 is filtered in line filter 91 and amplified in amplifier 92, while the demodulated reference signal p of the omnidirectional RF field which is fed through doubler 35 is also fed to doubler 96 to give a $4p$ signal of reference phase identical to that at transmitter. This is filtered at 93 and amplified at 94.

This $4p$ altitude reference signal of the neighboring craft is passed through electronic switch 95 which alternates passage of the received signal and local altitude reference signal, by actuation of the transmit-receive switch 29. In a similar manner, the $4p$ gamma altitude signal passes from amplifier 92 to electronic switch 99, which in turn alternates received and local altitude signals by control of transmit-receive switch 29. (The output of amplifier 83 is fed to switch 95, while the output of transformer 84 is fed to switch 99.) The passed signals from the switches operate an altitude reading, display or recording device whereby both self and neighbor's altitude are shown.

In FIGURE 7 is shown a preferred reading device for altitude. The altitude-sensitive signals from switch 99 are supplied to phase-sensitive detector 711 and phase sensitive detector 707. The reference signals from switch 95 are supplied to detector 711 and through 90° phase changing network 706 to detector 707.

Phase sensitive bridge 711 provides a signal proportional to the cosine of gamma, while bridge 707 provides a signal proportional to the sine of gamma. The cosine and sine proportional signals are applied respectively to the vertical deflection plates 708 and the horizontal deflection plates 709 of a persistent screen cathode ray tube 710. The resultant display is a radial line whose angle with respect to a reference is proportional to the angle gamma. Amplitudes of self and neighbor are arranged to be different for ease of distinguishing. Thus, the pilot can instantaneously determine differences in altitude between himself and his neighbors.

Figure 8:
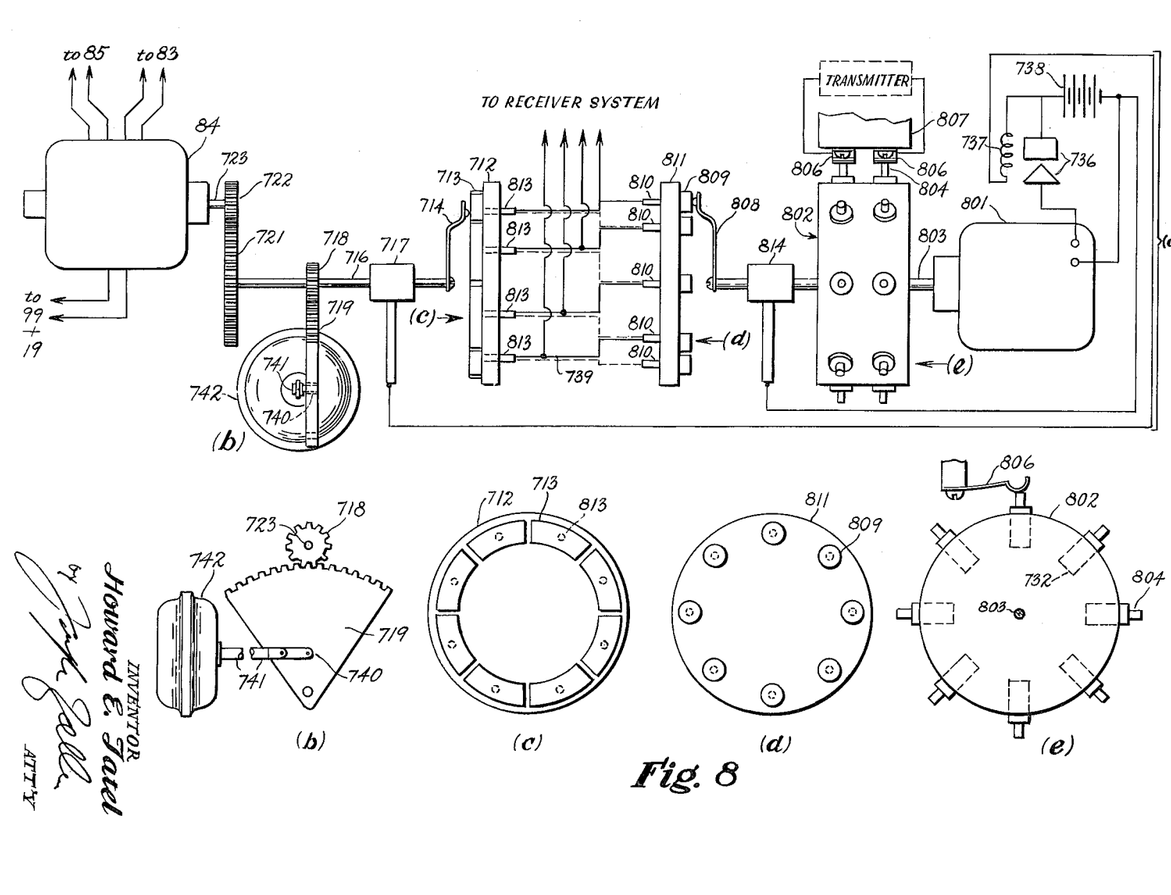
FIGURE 8 is a schematic diagram of an altitude zoning device usable in this invention.

The altitude-sensing device 88, to be explained in further detail, serves to automatically shift the basic RF frequencies of transmitter and receiver in each plane when the plane moves from one predetermined altitude zone to another. The mechanical arrangement is illustrated in FIGURE 8.

The control transformer 84 is mechanically coupled to the altitude zoning control 88 so that in this patent embodiment the altitude sensing element both rotates the rotor of the transformer and causes appropriate shifts in frequency for both the transmitter and receiver. The arrangement of this interlocking altitude zoning and altitude reading device is illustrated in FIGURE 8 wherein (a) is the general schematic diagram and side view, (b) the front view of a portion of the aneroid linkage action, (c) a left front view of insulating block 712 with its eight conducting centers, and (d) a right front view of insulating block with its motor buttons and (e) a right front view of the crystal turrets.

The expansion and contraction of aneroid capsule 742 caused by changes in air pressure with altitude is arranged to proportionally rotate the rotor in transformer 84 and to also step-wise bring a different operative quartz crystal into the transmitter and receiver oscillators. The same aneroid functions for both transmitter and receiver, and the shifting from one crystal to another in both the receiver and transmitter system oscillators 17 and 31 is accomplished electro-mechanically. FIGURES 8a, b, c, d, and e illustrate the aneroid, control transformer, the mechanically coupled shifting means, and the transmitter responsive shifting means, the receiver responsive shifting means being substantially identical with that of the transmitter-responsive shifting means and not illustrated. Wiring network 739 controls the receiver shifter simultaneously and in the same manner as that of the transmitter.

Capsule 742 in response to changes in air pressure moves linkage 741 pivoted on point 740 on gear 719. Gear 719 meshes with spur gear 718 which in turn is mounted on shaft 716. One end of shaft 716 contains gear 721 which meshes with gear 722 mounted on shaft 723 of control transformer 84.

The other end of shaft 716 passes into an insulating cylinder 717 which has a slip ring connected electrically to a spring arm 714. The movement of the aneroid thus causes arm 714 to rotate. Arm 714 is normally in contact with one of (in this case) eight conducting segments 713 mounted on an insulating block 712 through which each segment makes a terminal 813. Each terminal 813 is permanently wired to a corresponding terminal 810 extending through insulating block 811 to a metal button 809. In any particular position one of these buttons 809 is in contact with a spring arm 808 mounted on the end of a shaft 803. On shaft 803 is also mounted a slip ring 814 which is electrically connected to arm 808 of a crystal turret assembly 802 and, at its end opposite arm 808 to a gear reduction motor 801. Motor 801 connects to power supply 738 through relay contacts 736 which are normally closed when no current flows through coil 737. Arm 714 is electrically connected through slip ring 17 to one end of this coil 737, while arm 808 is connected electrically through slip ring 814 to one terminal of the motor. The other end of coil 737 is connected to power supply 738. Energizing of coil 737 is accomplished from 714, contacts 713, wires 739, contact 809, arm 808, slip ring and brush 814 and thence to the other terminal of power supply 738.

The crystal turret 802 contains eight quartz crystals 732 of different frequency as desired. Each crystal 732 has a pair of contacts 804 which permits engagements with a corresponding pair of conducting spring arms 806 leading to the transmitter oscillator 17. Thus, at any given time only one crystal is operative in oscillator 17.

The mechanical movement of arm 714 by the aneroid system from one sector to another causes the relay 736—737 to deenergize, which in turn starts the motor 801 to rotate. This rotation turns the turret 802 and then the spring arm 808 makes contact with the particular button 809 corresponding to the new position of arm 714. When this contact is made the resulting current reenergizes the relay coil thus opening contacts 736 and stopping the motor.

Where the turret is in the receiver an additional control is provided to allow drum 811 to be rotated in either direction so that a navigator may interrogate an adjacent zone to his own. Otherwise, drums 712 and 811 are in fixed position. To avoid sticking on the surface of the sector, an electromagnet can be placed on shaft 716 adjacent to arm 714 and be supplied with an oscillating current. This resulting vibrations of arm 714 preventing sticking.

*Alarm*

It is preferable to provide an alarm 900, which can be visual, audible, electrical, or otherwise and is actuated by the signal from amplifier 72 when a sufficiently discernible filtered signal is received from detector 32 (off receiver channel 30). In addition, to give an alarm-type indication of the number of neighbors within range, an identification system can be employed.

Thus, each craft has an AF oscillator 200 with a distinct and different frequency. This identifying signal is fed through amplitude-modulator 19 so that it is carried on an amplitude modulation on the RF signal from the monopole D. These signals, detected at 32, are filtered at 201 and amplified at 202. The signals are then fed to an AF mixer 203 to give beat-frequency signals only when more than one identification signal is received. These beat-frequency signals can be displayed on a cathode-ray tube 205 or otherwise brought to the attention of the navigator.

*Random Pulse Control*

In order to have operation of the transmitters and receivers in all the craft at substantially identical frequencies, a random pulse control system is utilized to obtain safe and proper response. Randomness need not be complete in the mathematical sense but there should be a high degree of randomness.

It is preferred that the receiver be normally on except for the brief intervals when the transmitter is excited, and that the excitation of the transmitter be at a sufficiently high rate so that there is effectively continuous indication.

In the illustrated embodiment (FIGURES 1, 3) a scintillation crystal 300 of sodium iodide is present containing dispersed through the crystal radium chloride of appropriate mass and radioactivity to give a disintegration rate yielding of approximately two counts a second after equilibrium sets in. The flashes of light from the interaction of the radioactive particles and the crystal are used to illuminate the photo-cathode of photo multiplier tube 301 inducing large negative voltage pulses in the anode. These pulses are preferably fed into a scaling circuit 302 (e.g. scale of two), which acts like a filter to eliminate extremely short or extremely long time intervals between pulses. Such a scaling circuit 302 can be of the Eccles-Jordan multivibrator type modified for counting with an appropriate input circuit for accepting the brief pulses and an appropriate biasing circuit for passing only large and fairly uniform pulses to monostable multivibrator 303.

Figure 3:
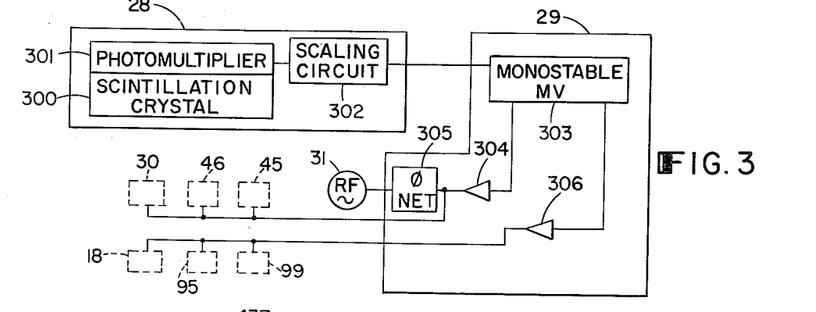
FIGURE 3 is a schematic diagram of the random pulse control circuit.

Multivibrator 303 is biased so that only the positive voltage pulses from the scaler cause actuation. The pulse rate of 303 is one half that of the photomultiplier or in this case an average of one per second. In this particular case a duty cycle of 0.050 second is selected and the output of 303 drives two cathode-coupled amplifiers, 304 and 306. The output of amplifier 306 drives a gating grid in transmitter RF multiplier 18 only when the gating pulse is positive. The output of amplifier 304 actuates a phase inverter 305 which cuts off local oscillator 31 when its output drops. This effectively makes the receiver inoperative while the transmitter is operative.

In addition, the signal from amplifier 304 also gates the RF portions of receiver sections 30, 45, and 46 in the receiver. This permits a high RF impedance when the transmitter is on and no RF power is lost. In the altitude modification the signal from amplifier 306 is also fed to the gating grids in electronic switches 95 and 99.

*Balanced Modulation*

Figure 4:
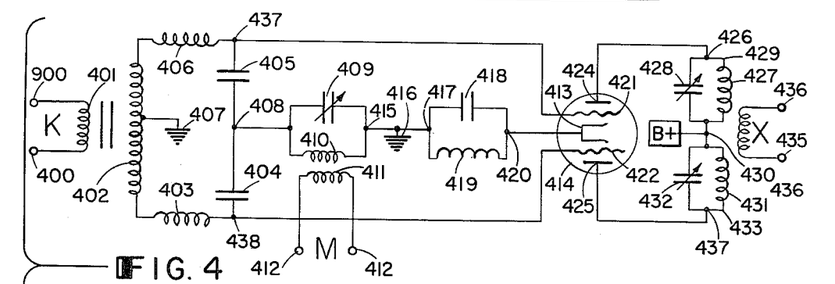
FIGURE 4 is a circuit diagram of the balanced modulator used in this invention.

The purpose of balanced modulation is to reverse the phase of the RF signal in response to the alternations of the audio frequency signal. One version is shown in FIGURE 4. A double triode 414, for example a 6J6, is used wherein the grids are fed in parallel RF and in series AF. The plates 424 and 425 feed the output circuit in series. The AF signal in effect, turns first one triode on, then the other. Since the currents from the anodes flow through the plate coil in opposition, the phase is reversed on each AF alternation.

An AF signal is introduced from terminals 400 to the primary winding of 401 of an audio transformer. The center tap 407 of the secondary winding 402 is grounded. The terminals of the secondary are separately connected through the radio frequency chokes 403 and 406 to the separate control grids 421 and 422, of the double triode 414. The radio frequency chokes 403 and 406 effectively connect the transformers with the grids for the AF currents, but permit no RF current to pass. Thus, the grids of triodes are swung 180° out of phase with the AF signal, alternating positive and negative with respect to ground and of sufficient magnitude to allow the triodes to conduct and not conduct in phase opposition. This is the audio circuit.

In the RF circuit the internally connected heaters carry the triode currents through resistance 419 bypassed by capacitor 418 to ground 416. 419 is the triode bias resistance and is chosen to allow the doubler triode to operate at the manufacturer's rating. Capacitor 418 bypasses the RF current to ground so that resistance 419 presents only a direct current and not an RF resistance and so that the triode cathodes 413 are at RF ground potential. The RF signal is injected from terminals 412 into the primary 411 of an RF transformer, the secondary 410 of which is tuned with variable capacitor 409 to make the whole RF grid circuit resonant at the radio frequency. One end of transformer secondary 410 goes to ground 416, the other is connected through RF capacitors 404 and 405 of low RF impedance and high AF impedance, separately but in RF parallel to the triode grids. This is the input RF circuit. The output or anode circuit is composed of the center tapped RF transformer 429 having primaries 427 and 433. The center tap 430 goes to a B voltage source, the anode voltage supply. Capacitors 428 and 432 are adjustable so that the whole plate circuit can be tuned to the RF and so that the phase of the output voltage appearing on the secondary 435 of the output transformer 429 changes 180° for each triode AF alternation. The balanced modulated RF signal appears at the terminals 436 of the RF secondary transformer.

The circuit is used in the transmitter as shown or in the receiver system, in which case we substitute IF for RF (see information Block in FIGURE 4).

Frequencies for operation of the basic system of this invention or the described modifications are chosen for low mutual interference among the various circuits. Thus, if "$p$," the reference frequency for transmission of heading and bearing information is 4,000 c.p.s., then "$2p$" used for balanced modulation of the rotating heading field will be 8,000 c.p.s., and the altitude information signal "$4p$" will be 16,000 c.p.s. With these frequencies, a suggested AF reference signal "$q$" for the bearing channels in the receiver could be 5,700 c.p.s., while the automatic gain control modulation "$z$" would be 9,300 c.p.s.

Where the ship RF frequency is 140 megacycles/sec. the RF for planes could be 800 megacycles/sec. In either case the local oscillators of the receiver would be selected to give an IF which is small, such as 2 megacycles/sec. The oscillator frequency for the automatic gain control would then be 1 megacycle/sec.

The embodiment illustrated above with its various modifications, is not intended to limit this invention to the particular elements and arrangement shown. Thus, although the single adcock combined directional and omnidirecitonal antenna is preferred because of its simplicity, lack of moving parts, utility for a plurality of neighbors, and interlocking characteristics, this invention can be practiced with other antennas and with separate antennas for receiving and transmitting. Also, bearing can be determined independently of this invention by previously described methods and displayed with the heading determined by the present invention.

As regards presentation of the heading and bearing angles, it is preferred to use the cathode ray tube and sequence control as shown, since this provides instantaneous visual comparison for a plurality of neighbors in a manner easy to observe and interpret. However, the angles may be separately or both displayed electro-mechanically on a dial or recorder. An example of such electro-mechanical display would be to use a magnetic iron housing with four poles each wrapped with a wire to form two sets of coils with an armature in the center. Feeding cosine and sine signals to the coils will provide a field which moves the armature proportional to the angle sought. Illumination of the armature position with a persistent fluorescent screen would allow for effectively continuously reading.

It is preferred that relatively low power be used in this invention, in that such both acts to limit the zone of active observation to a practical and useful extent and minimizes transmitter-receiver congestion from very distant craft. For most effective operation on a single antenna system transmitter and receiver are selectively matched and mismatched by proper choice of operating constants in the keyed tubes for both transmitter and receiver and sufficiently large pulses from the transmit-receive switch.

With the receiver on, an RF signal from the antenna travels along the transmission line to a T connection 25, 26, or 27. The transmitters are off and present a high impedance to the lines. The line length to the transmitters from the T junctions is made in integral number of half-wave lengths of the RF signal in the line since the terminal impedance of an integral number of half wave lengths of line is equal to the input impedance, the transmitters in the off-state present a high impedance at the T junctions. The high impedance of the transmitter at the T junction means little power absorption and the RF power from the antennas travels the receiver branch to the receiver where it is absorbed efficiently by the matched receiver input. Since the transmitters present a slight reactive component when off, the length of the line may be adjusted so that the reflected impedance at the T junction is truly resistive and high when the transmitter is off.

When the reverse condition prevails and the transmitter is on the power travels along the RF transmission lines to the T junctions. The line length from the T junctions to the receivers are adjusted the same way as above so that the transferred receiver off impedance is very resistive and very high. Thus, little power is lost in the receiver input and the power goes on to the antenna components as desired.

Design criteria follow those well known in the art. Thus, amplifiers in parallel and voltage resistive circuits should be gain stabilized. Filters to be chosen so that their phase shift with frequency is the same within certain preset tolerances. These tolerances are set by the agreed angular accuracy desired in the system. For example, an accuracy of 3° in bearing or heading would require components with maximum tolerance of about 2° in phase. The phase may be allowed to shift with frequency but not the phase difference between components. Thus, the difference in phase shift with frequency in handling signals $p$ and $2p$ in the transmitter must be the same as handling signals $2p$ and $2p$ alpha in the receiver. Meeting this requirement allows the phase angle to be abstracted in spite of unavoidable phase shifts in the system. Consequently, only modest frequency stability of the audio oscillators is necessary in the system.

In certain situations, a craft need only be equipped with the transmitter, as for example, in the case of small ships or planes where the expense and/or weight might be important. In such cases, the larger craft would be the ones avoiding collision. In all other cases, where each craft is fully equipped, traffic rules would govern the actual course taken to avoid collision.

It should be noted that obvious equivalents are within the scope of this invention. For example, phase reference information can be transmitted by frequency or subcarrier modulation as well as amplitude modulation. The frequency of the reference signals may be higher or non-integral as well as multiples.

There has thus been provided by this invention an all-weather system and method which enables the navigator of any ship or plane to automatically and instantaneously be made aware of the presence of each neighbor in dangerous or potentially dangerous proximity. The reading craft can continuously determine the instantaneous heading and bearing of any such neighboring craft without reference to any fixed surface installation.

I claim:

1. In a system of radio communication, a radio-frequency signal source, an audio-frequency signal source, means for multiplying the frequency of said audio-frequency signal, balanced modulator means for mixing said original audio-frequency signal with said radio-frequency signal to provide a first radio-frequency phase-reference signal modulated by said original audio-frequency signal, balanced modulator means for mixing said multiplied audio-frequency signal with said radio-frequency signal source to provide a second radio-frequency signal balance modulated by said multiplied audio-frequency signal, balanced modulator means for mixing said multiplied audio-frequency signal in quadrature with said radio-frequency signal to provide a third radio-frequency signal balance modulated by said multiplied audio-frequency signal in quadrature, omnidirectional means for transmitting said first radio-frequency signal in phase quadrature, means for separately radiating said second and third radio-frequency signals so that the combination with the omnidirectional unmodulated radio-frequency component in said first signal provides a radio-frequency wave modulated by the multiplied audio-frequency signal whose phase angle with respect to the reference signal is proportional to the angle which said given direction makes with a reference direction, means for receiving and demodulating said first transmitted radio-frequency signal so as to remove the radio-frequency and multiplying the audio-frequency frequency to provide an audio-frequency phase-reference signal of identical frequency as said original multiplied audio-frequency signal, means for receiving and demodulating said combined radio-frequency signal so as to remove the radio-frequency to provide a resultant audio-frequency signal of identical frequency as said original multiplied audio-frequency signal but of a phase difference proportional to said angle, and means for translating said resultant audio-frequency signal so as to display said angle.

2. The system of claim 1 wherein random switching means are provided to alternate the operation of transmitter and receiver.

3. The system of claim 1 wherein said RF transmitted signals contain an unmodulated omnidirectional RF component, and there are provided directionally-sensitive receiving means which act on said component to provide two signals whose amplitudes are proportional respectively to the sine and cosine of the angle beta between said direction and a second reference line; means being provided to separately balance modulate said latter RF signals with a fixed AF signal source and combine them with said unmodulated RF component in quadrature to provide two amplitude modulated signals, separate detecting means being provided to demodulate said amplitude-modulated signals to yield two signals of identical frequency but of amplitude proportional separately to the sine and cosine of angle beta; means being provided to translate said signals so as to display angle beta.

4. The system of claim 1 wherein said translating means comprises a phase sensitive network which converts said signal to a new signal proportional to sine of said angle, a phase sensitive network which converts said signal to a signal proportional to cosine of said angle, and means responsive to said new signals to display said angle.

5. A method of avoiding collision between a plurality craft comprising randomly transmitting from each craft a radio signal of identical frequency, comprising the steps of altering such signal as received in response to a first angle between the reference line of the transmitting craft and a line between the transmitting craft and the receiving craft, receiving said signal and combining it with a local signal indicative of a second angle between the reference line of the receiving craft and the line between the transmitting craft and receiving craft and processing said signals so as to display both said angles.

6. The method of claim 5 wherein said signal as transmitted contains an omni-directional component of radio frequency and a component constant in amplitude but having a phase angle which depends on said first angle.

7. The method of claim 5 wherein the transmitted radio frequency signal is amplitude modulated by two separate signals, one being phase reference and the other being a multiple of said phase reference in frequency.

8. The method of claim 5 wherein the signal to be transmitted includes modulated altitude information.

9. The method of claim 5 wherein the frequency of the radio signal differs in accordance with a predetermined stage of altitude.

10. The method of claim 5 wherein the radio frequency signal as transmitted is composed of two balanced-modulated radio frequency signals in phase quadrature.

11. A system of radio communication comprising a plurality of craft each having: a radio frequency transmitter; at least one horizontally omni-directional substantially isotropic antenna component; a second antenna component characterized in that the radio frequency signal transmitted thereby is constant in radio frequency amplitude but has a phase angle which depends on the angle between a local reference line on the craft and the direction line to the craft which receives the signal; a radio frequency receiver containing a first receiver channel supplied by said isotropic component and a second receiver channel supplied by an antenna component characterized in that the phase angle of the signal it receives depends on the angle between said local reference line and the direction line to the craft which transmits the signal; said first channel receiving the transmitted signal from a second craft to provide a first signal containing a phase angle depending on the angle between the direction line from one craft to another and the local reference line in the second craft; means associated with said two channels for providing a second signal which is responsive to the angle between the direction line from one craft to another and the local reference line on the first craft; and means for processing both said signals to provide a resultant signal showing both said angles relative to one another.

References Cited in the file of this patent
UNITED STATES PATENTS

| | | |
|---|---|---|
| 1,801,466 | Townsend | Apr. 21, 1931 |
| 1,922,677 | Greig et al. | Aug. 15, 1933 |
| 1,933,248 | Evans et al. | Oct. 31, 1933 |
| 1,983,079 | Hansen | Dec. 4, 1934 |
| 2,157,122 | Dunmore | May 9, 1939 |
| 2,457,199 | Best | Dec. 28, 1948 |
| 2,519,418 | Urick | Aug. 22, 1950 |
| 2,555,143 | Linder | May 29, 1951 |
| 2,568,568 | Stansbury | Sept. 18, 1951 |
| 2,590,230 | Castle | Mar. 25, 1952 |
| 2,621,306 | Varela et al. | Dec. 9, 1952 |
| 2,720,582 | Linder et al. | Oct. 11, 1955 |

OTHER REFERENCES

"Graphical Symbols for Electrical Diagrams," Y32.2—1954, American Standards Association, 10 East 40th St., New York 16, N.Y.

"Abbreviations for Use on Drawings," Z32.13—1950, American Standards Association, 10 East 40th St., New York 16, N.Y.